United States Patent
Ehrler et al.

(10) Patent No.: US 9,780,553 B2
(45) Date of Patent: Oct. 3, 2017

(54) OVERVOLTAGE PROTECTION DEVICE WITH SHORT-CIRCUIT FUNCTION FOR PROTECTING INSTALLATIONS AND PERSONS

(71) Applicant: DEHN + SÖHNE GMBH + CO. KG, Neumarkt (DE)

(72) Inventors: Jens Ehrler, Neumarkt (DE); Arnd Ehrhardt, Neumarkt (DE); Klaus Buehler, Eckental (DE)

(73) Assignee: DEHN + SÖHNE GmbH + Co.KG., Neumarkt (DE)

( * ) Notice: Subject to any disclaimer, the term of this patent is extended or adjusted under 35 U.S.C. 154(b) by 217 days.

(21) Appl. No.: 14/772,265

(22) PCT Filed: Feb. 13, 2014

(86) PCT No.: PCT/EP2014/052805
§ 371 (c)(1),
(2) Date: Sep. 2, 2015

(87) PCT Pub. No.: WO2014/135351
PCT Pub. Date: Sep. 12, 2014

(65) Prior Publication Data
US 2016/0013631 A1      Jan. 14, 2016

(30) Foreign Application Priority Data

Mar. 7, 2013   (DE) .................. 20 2013 002 222 U

(51) Int. Cl.
*H02H 1/00*         (2006.01)
*H02H 3/20*         (2006.01)
(Continued)

(52) U.S. Cl.
CPC ................. *H02H 3/20* (2013.01); *H01T 1/14* (2013.01); *H01T 2/00* (2013.01); *H02H 9/04* (2013.01);
(Continued)

(58) Field of Classification Search
USPC .......................................... 361/117–120, 127
See application file for complete search history.

(56) References Cited

U.S. PATENT DOCUMENTS

2009/0154044 A1* 6/2009 Crevenat ................. H02H 9/06
                                                                   361/91.1
2012/0127619 A1* 5/2012 Mikolajczak .......... H02H 3/023
                                                                   361/79

FOREIGN PATENT DOCUMENTS

DE         42 35 329 A1      4/1994
DE         195 45 505 C1     5/1997
DE     10 2007 024622 A1    10/2008

OTHER PUBLICATIONS

International Search Report and Written Opinion for International Application No. PCT/EP2014/052805, date of mailing: Apr. 29, 2014, date of filing: Feb. 13, 2014, no English Translation available, 9 pages.

* cited by examiner

*Primary Examiner* — Danny Nguyen
(74) *Attorney, Agent, or Firm* — Kelly, Holt & Christenson, PLLC; Christopher R. Christenson

(57) ABSTRACT

The invention relates to an overvoltage protection device with a short-circuit function for protecting installations and persons for low-voltage installations, wherein at least one overvoltage protection element and a thermally activatable short-circuit device are arranged in a common housing. The device is designed to be inserted into an NH fuse part, and
(Continued)

Figure 1:
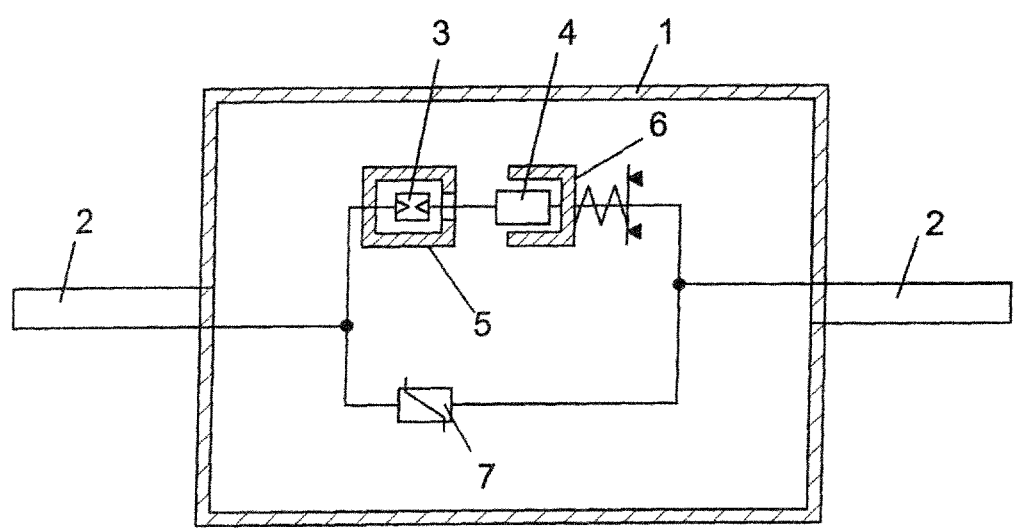

the common housing is designed with contact blades so as to be spatially analogous to a NH fuse link.

15 Claims, 11 Drawing Sheets

(51) Int. Cl.
*H02H 9/04* (2006.01)
*H01T 1/14* (2006.01)
*H01T 2/00* (2006.01)
H02H 9/06 (2006.01)
H01H 79/00 (2006.01)
H01H 85/048 (2006.01)

(52) U.S. Cl.
CPC ..... *H01H 79/00* (2013.01); *H01H 2085/0486* (2013.01); *H02H 9/06* (2013.01)

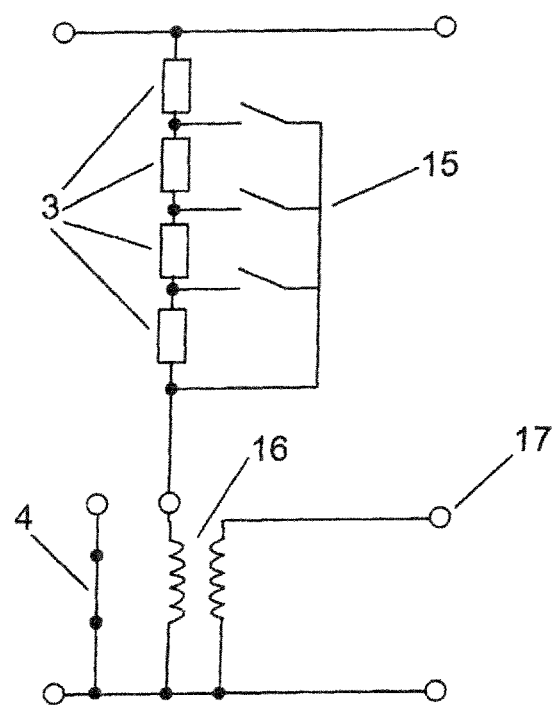

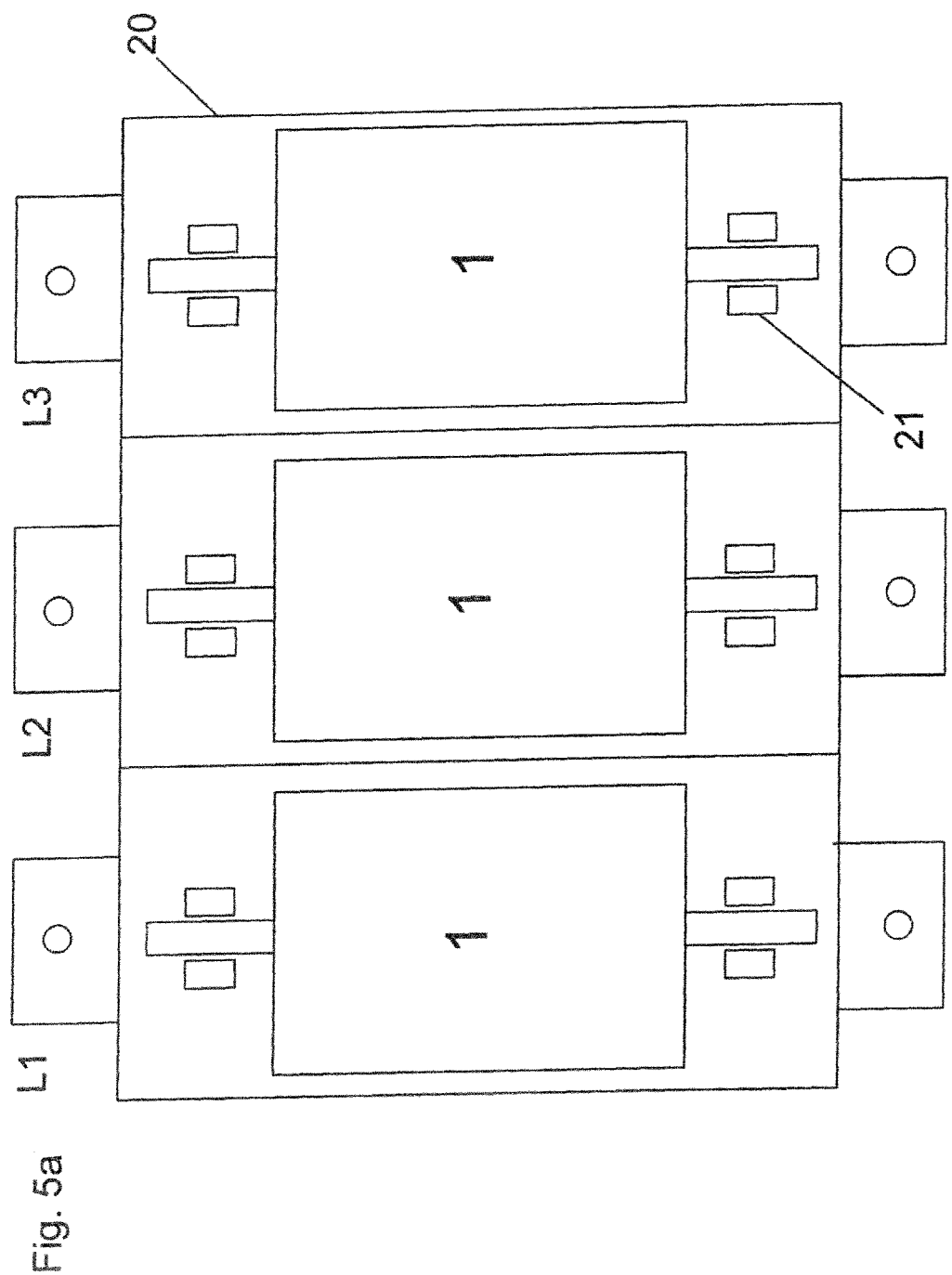

OVERVOLTAGE PROTECTION DEVICE WITH SHORT-CIRCUIT FUNCTION FOR PROTECTING INSTALLATIONS AND PERSONS

CROSS-REFERENCE TO RELATED APPLICATION

This Application is a Section 371 National Stage Application of International Application No. PCT/EP2014/052805, filed Feb. 13, 2014 and published as WO 2014/135351 A1 on Sep. 12, 2014, the contents of which are hereby incorporated by reference in their entirety.

The invention relates to an overvoltage protection device with a short-circuit function for protecting persons and low-voltage system installations, wherein both at least one overvoltage protection element as well as one thermally triggered short circuit device are arranged in a common housing as per the preamble of claim 1.

In industrial installations, components from different manufacturers are often combined and adapted to provide trouble-free operation under normal conditions. With respect to overvoltage protection, many power supplies, equipment and controls have specially adapted internal safeguards.

Such measures relate to protecting against operational, temporary and transient overvoltages. For example, the use of synchronized semiconductors generates high operational switching surges which generally requires internal or external overvoltage devices. Because adapting these specific measures is difficult in complex systems, undesired malfunctions may occur as a result of mutual interference, e.g. overlapping operating ranges.

In electrical systems in which protecting system installations and persons are closely linked, however, the adapting of individual safeguards becomes more important. Both preventing as well as selectively and safely remedying disturbances is thus absolutely vital in such systems.

There are higher safety and efficacy requirements on these measures particularly in the case of systems still able to pose danger to personnel even after the supply voltage has been shut off, e.g. when rectifying the disturbance.

These can include installations having electrical, chemical or mechanical energy storage comprising grid buffers, backup units or multiple feeds. For example, rotating machinery can switch from motor operation to generator operation upon disturbances and supply considerable voltage and energy for long periods before coming to a standstill. Depending on the engine's control, voltage generated during failures in generator operation can thus even be higher than the actual operating voltage.

To protect these systems, a protective device is frequently provided which implements a short circuit-like state upon a voltage limit being reached. Electronic circuits are thus known which implement a low-impedance state by actuating a power semiconductor upon deviations from normal operation. These devices often feature complex measuring and evaluating ability and can thus for example also evaluate the current and frequency in addition to the voltage level when assessing system state. Advantageously, these devices function reversibly and their response behavior can be adjusted very precisely. Disadvantageous, however, is that the complex evaluation results in time lags and that efficiency is greatly limited by components with acceptable price/performance ratios. In serious operational disruptions, this may at times even lead to the devices being destroyed. Moreover, it is virtually impossible to quickly replace these devices. In particular, the overloading of these devices frequently results in the undefined overloading of further devices, making a full comprehensive check of the complex system necessary subsequent the overloading of these generally inefficient devices.

As an alternative to such complex electronic devices, there are known solutions having simple overvoltage protection devices, for example based on spark gaps. After the spark gaps have been activated, they are to generate a conductive short circuit generally by fusing or by the melting of low-melt materials making up the electrodes or other additionally included materials.

The passive spark gaps, which are generally realized based on sliding distances, have a relatively short isolating distance between the main electrodes. The response voltage of these devices is highly scattered, gradient-dependent and also dependent on the environmental conditions. In the described application environments having numerous additional overvoltage safeguards within the complex systems, defined operation with these solutions is only possible when there is sufficient margin between the operating voltage and the voltage required for protecting the installations and persons.

A short circuit device is known from DE 42 35 329 A1, particularly for extinguishing arcing in low-voltage switchgear for distributing electrical energy. This prior art thereby relates to a solution which limits personal injuries and equipment damage caused by arcing, doing so by upstream circuit breakers inducing rapid disabling. A short circuit device requiring little space is proposed for the purpose. The short circuit device comprises at least one switching element and at least one short-circuiter, whereby the short-circuiter consists of two electrodes and conductive parts or regions, wherein a movable or deformable region is pressed against the electrodes upon the effect of an electrodynamic force, thus giving rise to a metallic short circuit. The short-circuiter connects the switching element between the two short circuit electrical potentials or busbars, wherein the current flowing in the switching element also flows to the conductive parts or regions of the electrodes. The at least one switching element has the form of at least one or two inverse-parallel thyristors which are fired by external firing pulses. The firing pulses are in turn initiated by an arcing fault.

Based on the foregoing, the task of the invention is thus that of specifying a further developed overvoltage protection device having a short circuit function for protecting persons and low-voltage system installations which, in an environment comprising specific overvoltage safeguards, results in no disruptions to further system components under normal operating conditions and which upon being activated realizes a defined low-impedance state with high current-carrying capacity. Additionally, existing overvoltage protection devices are to be protected against overload due to major disturbances. The overvoltage protection device is moreover to be quickly, easily and safely replaceable after being triggered.

The invention solves this task by an overvoltage protection device having a short circuit function for protecting installations and persons in accordance with the feature combination of claim 1, wherein the subclaims at the least constitute advantageous embodiments and further developments.

One therefore proceeds from an overvoltage protection device having a short circuit function for protecting persons and low-voltage system installations, wherein both at least one overvoltage protection element as well as one thermally triggered short circuit device are arranged in a common housing. The device is inventively designed to be inserted into an NH fuse base and the common housing is designed with contact blades so as to be spatially and geometrically analogous to an NH fuse element.

In one embodiment, the short circuit device is configured as a mechanical short-circuiter having a fixed and a movable part, wherein a sacrificial element is situated between the fixed and the movable part which triggers or enables an irreversible relative motion of the parts once a predefined $I^2t$ value is initially reached.

A status indicator with remote signaling function is additionally provided. The status indicator comprises the possibility of monitoring both how far the over-voltage protection device is set into an NH fuse base as well as also the actual operating condition.

In addition to a microswitch, the status indicator can also comprise a mechanically released pin, wherein the pin blocks the device from re-inserting into the NH fuse base when released.

In one embodiment of the invention, a parallel connection is arranged in the common housing of the overvoltage protection device which consists of a series connection of voltage-switching element, the sacrificial element and the short circuit device in the first branch and at least one voltage-limiting element in the second branch.

The voltage-switching element can be configured as a spark gap, gas discharger, semiconductor switch or diode, including one which is triggerable.

The voltage-limiting element is for example formed as a varistor or PTC element or comprises a series connection of varistor and PTC element.

The sacrificial element is preferentially formed as a metallic part having defined melting properties upon current load.

The sacrificial element can alternatively or additionally be fixed in temperature-sensitive manner and triggered independently of its melting integral upon a defined temperature being reached.

In one embodiment of the invention, the operational and sensitivity range of the device can be set via an access opening in the housing.

The response voltage can be set by adjustable voltage dividers or bridges or by isolating provided switching elements or passivating or activating electronic components.

The pin constituting the status indicator is preferentially formed as a spring-loaded firing pin, its movement enabled by the movable part of the short circuit device upon a short circuit but otherwise blocked. The direction of movement and the distance traveled by the firing pin can be selected independently of the direction and extent of movement of the movable part of the short circuit device.

Using a power semiconductor as a voltage-switching element can ensure targeted control of the device upon electrical or mechanical disruptions to the respective system to be protected.

In one variant of the invention, the short-circuiter with the sacrificial element can be integrated into a spark gap as the overvoltage protection element employed. The spark gap can thereby be configured with or without a triggering unit.

Despite its predominantly passive design, the proposed overvoltage protection device is insensitive to both operation-related disturbances as well as low-energy transient loads. The protective device's response value is kept relatively constant in a wide frequency range. In a further embodiment, the response value variance can be greatly limited even upon strong fluctuations in the environmental conditions. When the overvoltage protection device is activated, a defined dynamic and persisting short-circuit state able to carry a load is realized. The state of the short circuiter is signaled and indicated. Nor does a short-circuited overvoltage protection device pose any danger to personnel even if replaced carelessly, for example should the system not be in de-energized state.

The overvoltage protection device has the geometrical dimensions of an NH fuse and is preferentially used in an NH fuse switch disconnector.

The fuse switch disconnector comprises an indicator which registers the element of the protective device as well as the opening. In addition, the fuse switch disconnector has a microswitch function with which the state of the overvoltage protection devices and/or their triggering can be remotely signaled. The fuse switch disconnector additionally has sufficient circuit-breaking capacity such that the overvoltage protection elements can be safely opened in fail-short function even at nominal system voltage.

The overvoltage protection device has a very narrow defined response range with just low dependency on environmental conditions as well as on the slew rate. The overvoltage protection device comprises a so-called sacrificial element which irreversibly triggers the movement of a mechanical short-circuiter upon short circuits and upon reaching a defined $I^2t$ value. The short-circuiter can alternatively or additionally be thermally activated by a flow of current. Despite the device's voltage-limiting effect, the short-circuiter is not activated by overvoltages associated with lower energy, for example switching or burst pulses. The continuous current capacity of the sacrificial element is designed to be lower than the nominal current rating of the system's overcurrent protection devices. The device's short circuit-carrying state amounts to a multiple of the system's nominal current such that large-mass rotating machinery can also safely discharge feedback energy for longer periods even when switching from motor operation to generator operation. The voltage drop provided by the protective device is below the limit values of the characteristic curve for protection of personnel even at currents of several 10 kA.

Both the response voltage as well as the $I^2t$ value of the sacrificial element can be easily predefined in the passive design. In a further active implementation, the response voltage can be variably adjusted.

Particularly the easy and safe replaceability of a "passive" protective component during actual system operation is naturally problematic since the system is in principle also functional without the protective device. For safe operation, however, it is absolutely necessary for the protective device to be installed. Generally speaking, protective devices are fixedly connected to the system. There is often not even a clear indication or error message when said devices respond. Restarting operation is therefore frequently associated with extensive troubleshooting, dismantling and reinstalling performed by qualified personnel.

The inventive overvoltage protection element is preferentially manufactured in single-pole design with NH fuse geometry. This geometry enables use in NH fuse base parts of corresponding size. This likewise allows the protective device to be flexibly integrated into the network to be protected. Hence, depending on system, arrangements of the overvoltage protection device to ground, to the neutral lead between the phases or also combinations can be easily realized by external and/or internal connections.

In order to prevent the elements from being removed after startup without being noticed, the proposed use of the units in an NH fuse switch disconnector includes the feasibility of locking and/or also lead sealing. NH fuse switch disconnectors with electrical remote signaling of disconnector state are preferentially used. This allows integration into the general control and monitoring of the system and results in a direct and clear malfunction notification upon system start even without visual check, which enables the complete control of the protective device elements subsequent the startup of the system.

Clearly indicating the presence of the overvoltage protection element does not, however, provide any information as to its state. The overvoltage protection device is therefore at least equipped with a visual indicator similar to that of fuses which clearly identifies the short-circuit state upon a visual control. Particularly preferential, however, is an indicator having a firing pin which sends a clear message to the system control given a likewise preferential NH fuse switch disconnector with remote signaling contacts in the event of one or more fuse elements short-circuiting. This facilitates a quick and targeted system restarting operation. The firing pin also reliably prevents use of a previously triggered element.

Using the protective devices in an NH fuse switch disconnector can ensure a safe removal of short-circuited protective devices since the selected control unit has its own switching capacity which is higher than the system's nominal voltage and current. Thus, even given improper operation; i.e. opening not yet completely switched off system overcurrent protection devices, or also during generator operation, disconnecting the low-ohmic short-circuit bridge when opening the switch disconnector poses no danger to the operator.

As previously noted, due to the operational and system efficiency, the voltages occurring during operation and the voltages required for protecting the system and personnel can be very close to one another. Yet activation of the protective device during normal operation needs to be prevented. Likewise to be prevented is activation in response to low-energy disturbances at higher amplitudes despite overvoltage limiting.

The following will reference embodiments as well as figures in describing the invention in greater detail.

Figure 2:
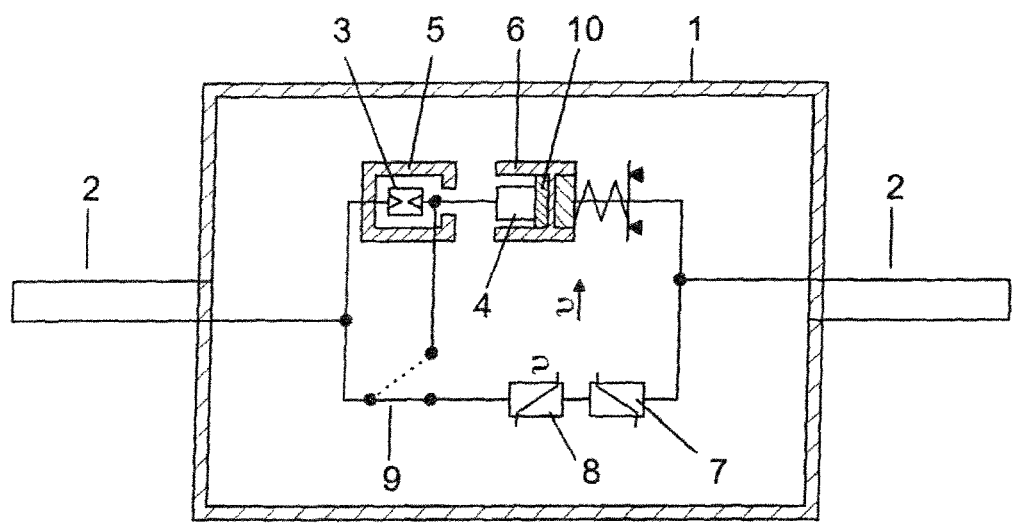
Figure 3:
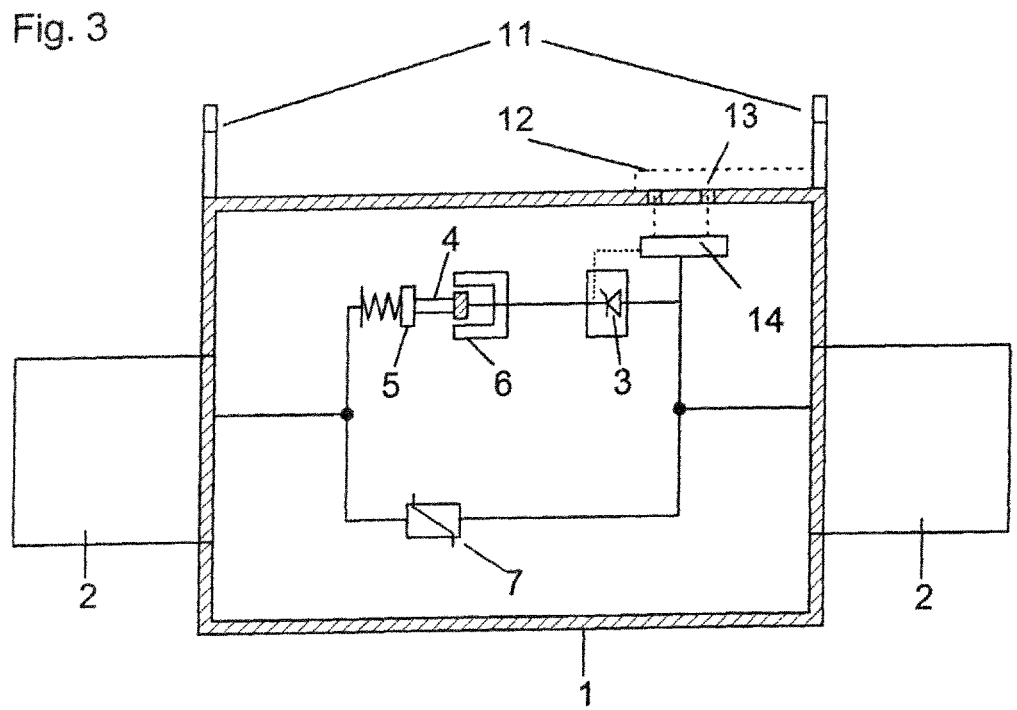
Figure 4B:
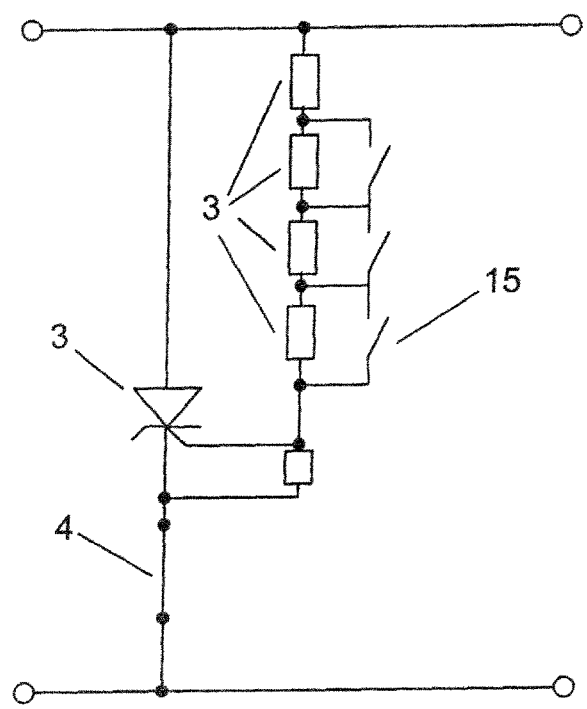
Figure 4C:
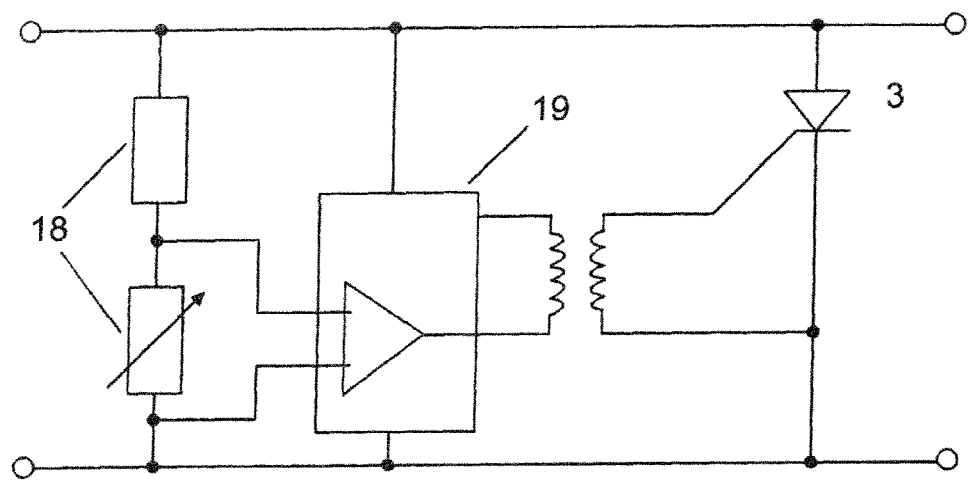
Figure 5B:
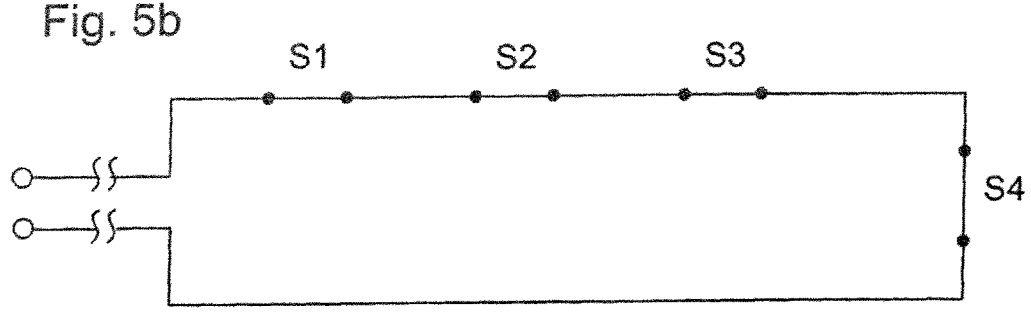
Figure 5C:
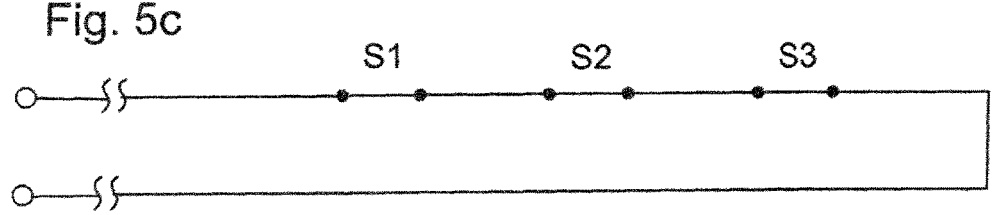
Figure 5C:
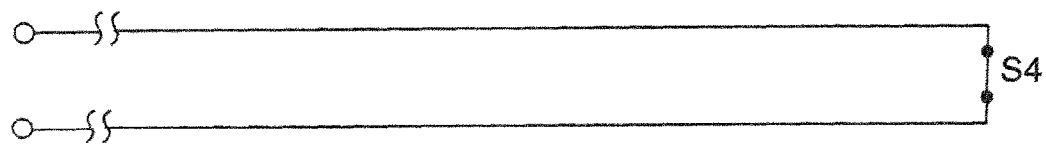
Figure 6:
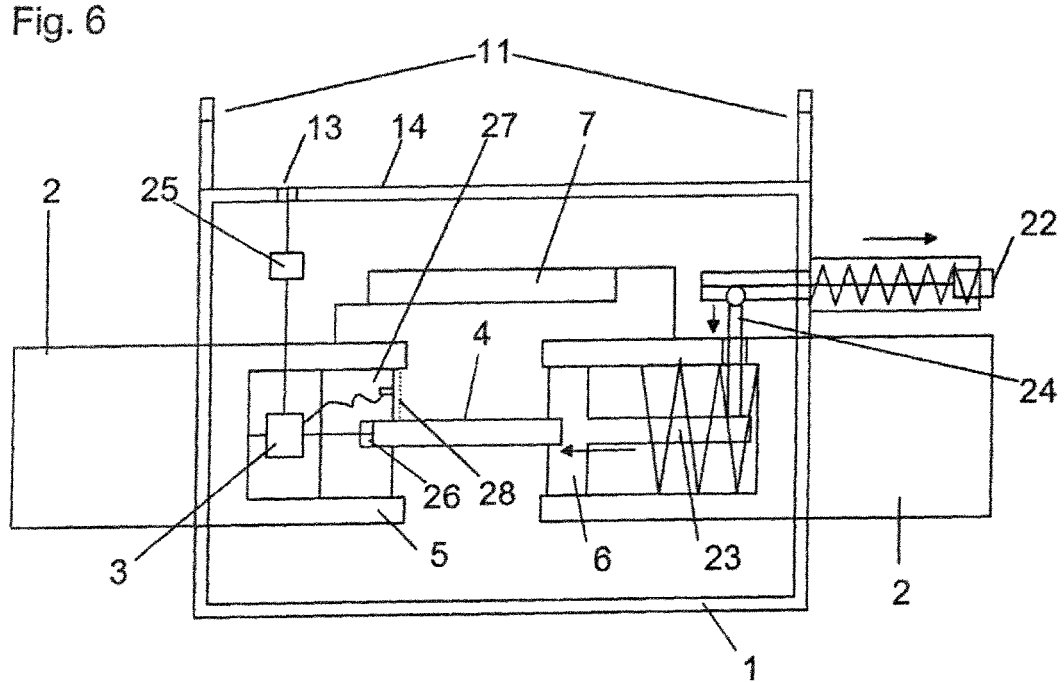
Figure 7:
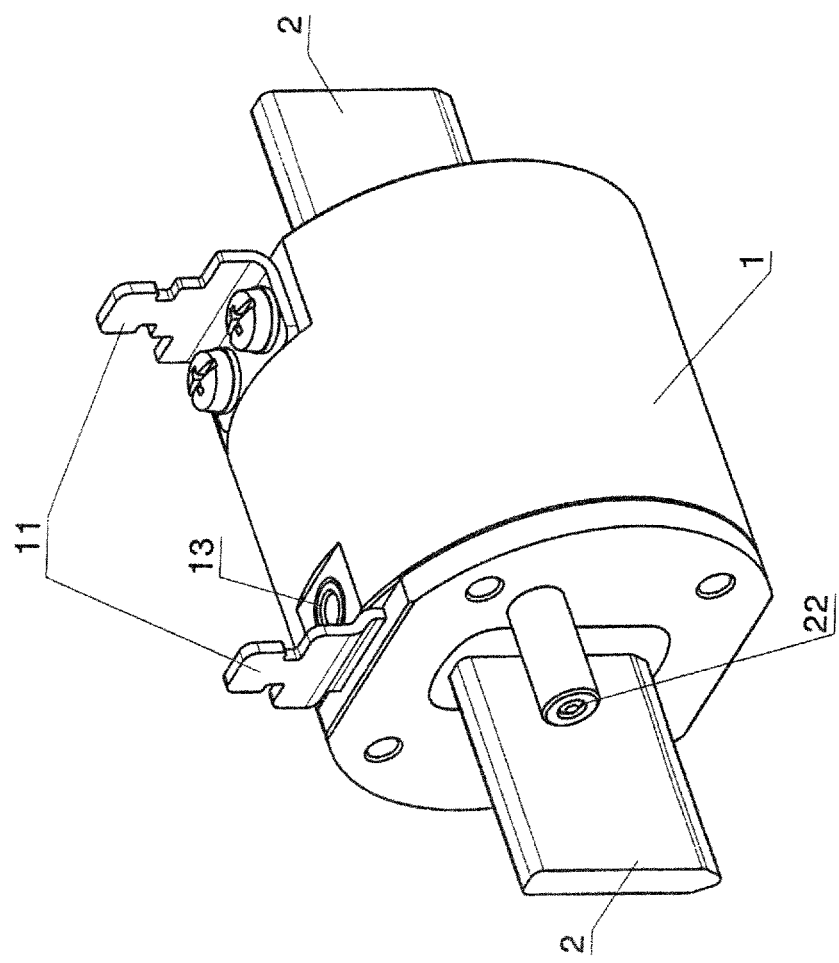
Figure 8:
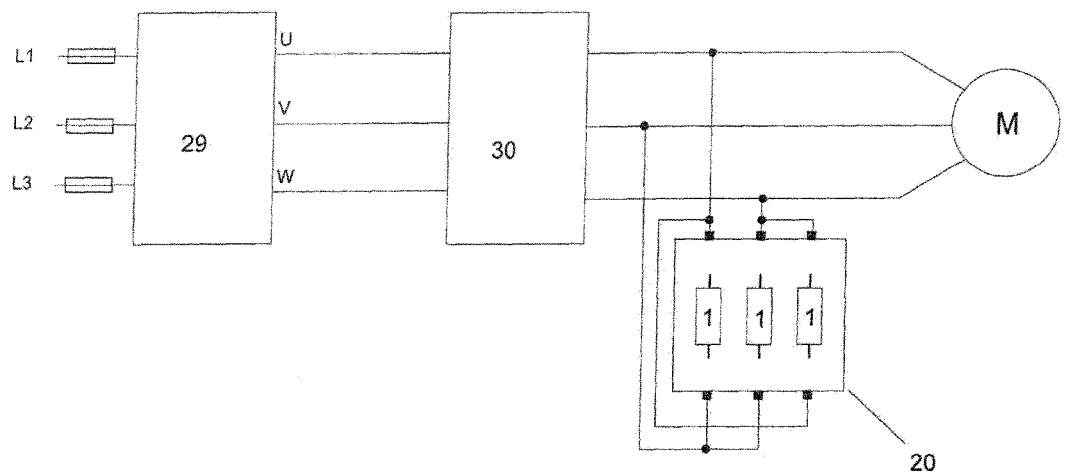

Thereby shown are:

FIG. 1 a first embodiment of the overvoltage protection device in an NH structural form with internal short-circuiter for network applications;

FIG. 2 a second embodiment of the overvoltage protection device;

FIG. 3 a third embodiment of the overvoltage protection device in a basic diagram of a response voltage setting option;

FIG. 4*a* to *c* different basic embodiments of feasible response voltage settings;

FIG. 5*a* to *c* representation of a basic arrangement of the inventive overvoltage protection device in the form of an NH fuse element situated in an NH fuse base (FIG. 5*a*) and different circuitry relative to an implemented monitoring function of the inventive overvoltage protection device (FIGS. 5*b* and *c*);

FIG. 6 a basic layout of an overvoltage protection device in NH structural form having a firing pin for visual function indication;

FIG. 7 a perspective view of an implemented embodiment of the overvoltage protection device with a firing pin as a function indicator; and FIG. 8 a block diagram of an inventive overvoltage protection device application.

For the purpose of realizing a passive solution, an arrangement as per FIG. 1 is proposed. An electrical parallel connection is arranged within a housing 1 having two connections in the form of contact blades 2. One branch of the parallel connection consists of a series connection of voltage-switching element 3, sacrificial element 4 and short-circuiter comprising electrodes 5 and 6. When the sacrificial element responds, this branch is bridged by the low-impedance short-circuiter consisting of the two electrodes 5, 6. At least one of the electrodes is movable and preloaded by a spring. At least one voltage-limiting element 7 is situated preferably parallel to the overall arrangement.

The element 7 can be configured as a varistor or as a combination of varistor and PTC. The element only limits overvoltage as of a level at approximately double the nominal voltage. Below this voltage, the overall overvoltage protection element remains passive. The element 7 can additionally be a high-impedance resistance connected in parallel. The entire arrangement has negligible electrical capacity such that there is barely any reactive current flow even at high frequencies. Among other designs, the voltage-switching element 3 can be passively configured as a gas discharger, diode(s) or also actively configured as a triggerable spark gap or semiconductor switch. The sacrificial element 4 is preferentially a passive metallic element having a defined melting behavior upon current load similar to that of an electric fuse. The time-current characteristic curve is defined both in the adiabatic realm as well as with long melting times and can be adapted to different system protective fuses independently of the short circuit-carrying capacity of the element. In addition to the melting point of the sacrificial element's metallic material, the mounting of the element 4 can also be of temperature-sensitive design so that, independent of the time-current characteristic curve of the element 4, the short-circuiter will also only be triggered once a defined temperature has been reached.

The sacrificial element 4 can perform an e.g. supporting function. In this case, the movable electrode 6 subjects component 4 to pressure and the spring is configured as a pressure spring. If the spring for moving the electrode 6 is designed as a tension spring, the element 4 is subject to tensile loading. When subjected to pressure, the element 4 can for example be of tubular design and when subjected to tension, of cable-like design.

When a gas discharger is used as voltage-switching element 3, the direct current voltage response value is then selected so as to be clearly higher than the response value of the voltage-limiting element 7. Additionally preferential for the application is selecting a gas discharger having low diffusion and a flat characteristic curve, thus a lower slew rate dependency. Being adapted to element 7 for example ensures response voltage burst pulses in the range of the narrow diffusion at the same response level of the gas discharger 3 for the overvoltage protection element upon overvoltages of much lower voltage gradient up to voltage pulses of higher voltage gradients.

Lower-level overvoltage pulses, or of lower energy respectively, are discharged by the voltage-limiting element 7 without the voltage-switching element 3 responding. In the case of high-energy loads, the sacrificial element 4 is subjected to current upon the responding of component 3. The overvoltage protection element is of low impedance at this point in time so that just before a metallic short circuit occurs, the requirements as to system and personnel protection are met. The metallic short-circuiter is then triggered and the movable electrode 6 guided to the fixed electrode 5 pursuant to the time-current characteristic curve of the sacrificial element 4. The resulting metallic short circuit can safely handle short-circuit cur-rents of several 10 kA and also has a high continuous current capacity of several 100 A.

The selection of the passive elements, particularly parts 3, 4 and 7, enables the overvoltage element to be easily adapted to the most differing requirements. With respect to the power limit, the selection of the NH fuse switch disconnector plays a decisive role. These devices are currently available with so-called separator blades for voltage levels up to approximately 1000 V, continuous current up to approximately 1000 A and short-circuit current up to approximately 25 kA.

The overvoltage element can have additional protective devices in the branch with the voltage-limiting element 7 which ensure reliable operation during periods of prolonged loading. FIG. 2 shows an example of this type of basic arrangement. Combining a varistor with a PTC 8 can limit the current through the varistor upon unwanted heating of the varistor and element 3 can be activated as needed upon sufficient driving voltage. The heat can however also be used for varistor separation.

Should activation of the short-circuiter be desired in this case, this can be achieved by utilizing the movement of the isolating loop 9. The loop 9 can hereby be a connection from a network-side connection directly to the sacrificial element 4 bridging element 3. All that is to be ensured here is that the isolating loop 9 has a higher current-carrying capacity than the sacrificial element 4. The temperature-sensitive fixing 10 of the sacrificial element 4 can however also make direct use of the dissipated heat of element 7, or also any PTCs 8 which may be respectively provided, to trigger the short-circuiter. Active elements 3 can naturally also occasion an NTC or PTC activation of the semiconductor upon the arrangement being heated.

The implementation of the overvoltage protection element as per FIGS. 1 and/or 2 only allows a one-time setting of the operating range during manufacture. FIG. 3 shows a schematic diagram of an arrangement which allows the operating range to be adjusted to the respective application after the overvoltage protection device has been installed into an NH fuse-like link.

To this end, the NH link preferably comprises a removable cover 12 or an opening 13 for entry of a special tool on the side between the NH grip tabs 11. This allows the simple setting of the "response voltage" of component 3 when using a triggerable spark gap as well as setting in embodiments making use of a semiconductor switch as element 3.

The functional elements of the overvoltage element are of course designed for the upper load limit in such an implementation. This particularly relates to the maximum operating voltage, on which the dielectric strength of all the components and isolating distances is based, and the maximum mechanical and thermal short-circuit current through the short-circuiter.

The adaptation is therefore essentially limited to setting the response voltage. In accordance with the FIG. 3 depiction, a thyristor can for example be used as a semiconductor switch, although using an IGBT or Mosfet is also conceivable. Should for example a conventional comparator circuit be used for voltage sensing and evaluating, continuous setting can for example occur via one or more adjustable components in the voltage divider. Alternatively, the voltage divider can be formed by a plurality of components in longitudinal or parallel connection and settings made by passivating or activating individual components of the voltage divider, for example by bridging or contacting. This variant enables the setting of discrete response voltage stages. This principle is generally also possible with simple activation of the power semiconductor, for example a thyristor with suppressor diodes. The series connection of suppressor diodes can in this case be used to set discrete stages by bridging individual diodes. FIG. 3 only exemplarily and symbolically suggests the control 14 due to the numerous possibilities.

The exclusively schematic basic representations in FIGS. 4a to 4c show only a few examples of subsequent incrementally or also infinitely settable response voltage for an overvoltage protection element with short-circuiter function. FIG. 4a shows an incrementally adjustable implementation having a series connection of passive voltage-switching elements 3. The elements can be, inter alia, diodes, suppressor diodes, gas dischargers, etc. Contacts 15 which allow the bridging of individual or multiple elements 3 are provided parallel to said elements 3. The elements 3 can of course also have voltage-controlling measures. In addition to mechanical mechanisms, bridging can also be realized by electronic components. The series connection can be directly connected to the sacrificial element 4 as well as to a trigger device for firing a spark gap, for example via an ignition transformer 16 and an auxiliary electrode contact 17. The spark gaps not shown in FIG. 4a are thereby connected in series to the sacrificial element.

FIG. 4b shows a variant in which discrete setting of the response voltage ensues by adjusting the trigger threshold of a semiconductor component. The representation depicts a circuit with a thyristor serving as element 3 and connected in series with the sacrificial element 4 in a simplified embodiment. Other semiconductor components are of course likewise applicable. The circuit can however also serve in actuating an active or passive firing device for the section between a main electrode and the sacrificial element, as will be described below with reference to FIG. 6.

FIG. 4c symbolically depicts a possibility for infinitely variable control, the response voltage thereby realized by the adjusting of the voltage divider 18 of a comparator circuit 19 which serves to activate a power semiconductor 3.

Activation of the short-circuiter via a semiconductor switch is in particular to be preferred when the desired response voltage is for example only to be within a small tolerance, e.g. from only 10 or just a few 10 V, or also at very low voltages of for example <100 V. Appropriately selecting and dimensioning the circuit also makes the solution well suited to sharply fluctuating environmental conditions, e.g. temperature or humidity.

FIGS. 5a to 5c symbolically depict an arrangement of three overvoltage protection elements 1 in an NH fuse switch disconnector 20. For the sake of clarity, FIG. 5a does not depict the cover in which the fuse grip tabs 11 are attached for safe insertion and removal. The blade connector contacts 21 of the switch and the individual phases L1, L2; L3 are safely separated against each other in accordance with low-voltage requirements when fuse elements 1 are extracted or drawn out. For application with overvoltage protection elements, the connections can be interconnected by the appropriate external/internal connections. This allows both the arrangement of the devices between the phases as well as to the neutral lead and/or to ground. A combination of these circuits allows a further single-pole or respectively also a three-pole NH circuit breaker to be used.

The NH fuse switch disconnector 20 has, as noted above, the feasibility of locking and blocking, or lead sealing respectively, after the fuse links have been inserted and the cover closed.

Preferentially, however, the NH fuse switch disconnector is used with a remote signaling contact which indicates the presence of the fuse/fuse element in the fuse base or the opening of the cover respectively. An embodiment with a remote signaling contact in accordance with FIGS. 5b and c is however particularly preferential. The NH fuse switch disconnector has a looped contact S4 which monitors the cover opening and, by means of break contacts S1-S3, the status of the fuses/fuse elements. Switch S4 is closed upon the closing of the cover. In conjunction with a control device and if necessary a locking and/or lead sealing, protection is ensured even should system operation without fuse elements be prohibited despite easy replaceability in the event of malfunction. If the fuse elements 1 are provided with firing pins as per NH fuses, the break contacts S1-S3 can detect the state of the elements. The FIG. 5b) arrangement only allows the joint monitoring of these states with a control device display. In contrast, however, the break contact arrangement of FIG. 5c) permits separate signal evaluation in the control device and thus provides detailed information upon a disturbance.

In order to determine the state of the overvoltage protection element, a firing pin which corresponds both geometrically as well as mechanically to that of an NH fuse needs to be integrated into the NH-like link. With NH fuses, the geometrical arrangement is situated external of symmetrical axes. The stroke and the force of the firing pin are designed to, inter alia, activate switches and are thus relatively long or large.

Both the asymmetrical arrangement as well as the long stroke of up to 20 mm work against directly utilizing the movement of the electrode 6 at a stroke of only a few mm.

Movement is generally realized in fuses by fixing the firing pin to a further fuse element. The firing pin is preloaded by an external spring upon the fixing of the additional fuse element at a lower nominal current rating. This principle allows for virtually any positioning, forces and strokes. It also entails no appreciable additional costs apart from the cost of the additional parts when manufacturing the fuse. Although it cannot be utilized with short-circuiters having lesser stroke. The following non-limiting solution is thus nevertheless proposed for realizing a high-force and long-stroke firing pin.

FIG. 6 shows a greatly simplified example of the internal structure of an over-voltage protection element 1 having an external firing pin 22. The moving electrode 6 of the short-circuiter has a rod-shaped extension 23 which projects into a stationary part of the element. When the short-circuiter is open, the extension blocks a pin 24, which in turn blocks the spring-loaded firing pin 22. When the short-circuiter closes, the rod-shaped extension moving at the same time releases the pin, expelling the firing pin. The arrows within FIG. 6 indicate the movements made from the inside outward (also from a chronological perspective). This solution allows the firing pin to move independent of the short-circuiter. A sliding or rolling movement of the pin also allows the most independent dimensioning of the short-circuiter and firing pin spring force possible. The relatively free dimensioning of the position and geometry of the pin also enables the position and geometry of the moved (6) and the stationary electrode (5) to be selected independently of the firing pin's external position.

In the implementation according to FIG. 2, the firing pin solution can of course also be coupled with movement of part 9. Instead of the pulling motion of the moving electrode, a pushing motion of the accompanying tappet can also be utilized. Likewise, the pressure of the moving electrode upon reaching the stationary counter-electrode can also be used by integrating a moving tappet into the fixed electrode.

According to FIG. 6, the setting of the response threshold via opening 13 can ensue at a separate unit 25 coupled with voltage-switching element 3.

As for example in FIG. 1, the voltage-switching component 3 can be connected directly to the sacrificial element 4. In this case, the component must continually conduct the current until the sacrificial element 4 fuses. Using FIG. 6 as a basis, two further possibilities are to be indicated. Component 3 can be a trigger unit for a spark gap. The spark gap itself consists of the sacrificial element 4, or respectively support element 26 galvanically connected to same, the stationary main electrode 5 and an isolated auxiliary electrode 27 arranged between components 4/26 and 5. This arrangement has the advantage of no separate spark gap needing to be formed and the necessary additional electrical connections not needing to have any appreciable cross section due to the low current load.

When no triggerable spark gap is used in the adapting of the response voltage, but rather e.g. a thyristor, its current-carrying capacity can also be selected independently of the $I^2t$ value of the sacrificial element when an auxiliary fuse element 28 of minimum cross section insulated on at least one side is used for igniting the isolating distance between element 26/4 and the stationary electrode 5. For the sake of clarity, FIG. 6 only indicates the auxiliary fuse element 28 symbolically by means of a dotted line and the representation omits the circuitry with element 3. Overloading of this minimal fuse element results in sparking, or also heavy carbon depositing respectively, between the two main potentials, whereby an arc also forms between the stationary electrode and the sacrificial element, which is thereby overloaded by the arc erosion, or the current flow respectively, and moving electrode 6 moved toward electrode 5.

FIG. 7 shows the exemplary external structure of a corresponding overvoltage protection element 1. In addition or alternatively to firing pin 22, the element can of course also have a visual indicator displaying the status of the element. The visual indicator can be similarly designed; i.e. indirectly and/or also directly linked to the movement of the electrode. The design requirements are low since there are no requirements as to force and stroke and thus a more detailed description will be dispensed with. With thermal triggering, a simple color change of temperature-sensitive material can naturally also be used in place of a movement, particularly in the case of just a straight display.

When using element 1 with firing pins 22, for example as per FIG. 7, there is a clear and visible warning, particularly by means of colors, prior to an actuated firing pin having a stroke of approximately 20 mm inserting into the NH fuse switch disconnector. Even without electrical control, there is therefore an extremely low risk of using a previously actuated element and thus inadvertently triggering a short circuit. Even purely mechanical protection can be realized due to the special design to the disconnector cover, representing a further safety aspect of the proposed solution.

Apart from the proposed mechanical display and blocking, electrical monitoring of the overvoltage protection elements 1 can of course also be implemented. Separate current sensors can be used to this end or also a current transformer integrated into the NH fuse switch disconnector. The proper use and replacement of fuses in an NH fuse switch disconnector during electrical system operation is feasibly common and safe even under load. Using such a circuit breaker also allows overvoltage protection elements with short-circuit function to be safely installed in electrical systems pursuant to the proposed design and dimensioning.

FIG. 8 shows an exemplary three-phase system arrangement for running an engine. The arrangement comprises a converter and a control 29 for operating the engine which is provided for example with a separate protective device including overload protector 30. The inventive overvoltage elements 1 are inserted into NH fuse switch disconnector 20. The elements 1 are electrically arranged between the phases in the example arrangement by external circuitry. Upon a malfunction, e.g. a power supply outage or control malfunction, the engine can switch to generator operation. At high rpms, a voltage clearly higher than the actual nominal voltage is thereby produced. The quick responding of the elements 1 continuously and safely limits the voltage to a very low value both at the engine as well as equipment 29 and 30 until the engine is stationary.

The previous implementations started from overvoltage protection elements 1 which react actively and/or passively upon reaching a threshold voltage. Particularly the implementations involving voltage-switching elements 3 based on power semiconductors, however, can also be actively integrated into the system protection concept. Selectively controlling the switching element 3 can switch the system into a safe state upon electrical or mechanical disturbances. This can also be of importance to personnel safety in case of accidents or fire. This function can additionally be realized by a simple (wired or also wireless) signal interface.

LIST OF REFERENCE NUMERALS 1 overvoltage protection element housing
2 contact blade of overvoltage protection element housing
3 voltage-switching element
4 sacrificial element
5 first electrode of short-circuiter
6 second, spring-loaded electrode of short-circuiter
7 voltage-limiting element
8 thermistor, PTC
9 isolating loop
10 temperature-sensitive fixing of sacrificial element
11 NH element grip tabs
12 removable cover
13 opening in element housing
14 control
15 contact for bridging elements 3
16 ignition transformer
17 contact for auxiliary electrode
18 voltage divider
19 comparator circuit
20 NH fuse switch disconnector; NH fuse base
21 blade connector contact
22 firing pin
23 rod-shaped extension pin for blocking a separate unit
24 blocking pin
25 separate unit
26 support element
27 auxiliary electrode
28 auxiliary fuse element
29 converter with control
30 overload protection

What is claimed is:

1. An overvoltage protection device with short-circuit function for protecting persons and low-voltage system installations, the overvoltage protection device comprising:
at least one overvoltage protection element as well as one thermally triggered short circuit device are arranged in a common housing; and
wherein the device is designed to be inserted into an NH fuse base and the common housing is designed with contact blades to be spatially analogous to an NH fuse element.

2. The overvoltage protection device according to claim 1, wherein the short circuit device is configured as a mechanical short-circuiter having a fixed part and a movable part, wherein a sacrificial element is situated between the two parts which triggers or enables an irreversible relative motion of the parts once a predefined or predefinable $I^2t$ value is reached.

3. The overvoltage protection device according to claim 1, and further comprising a status indicator having a remote signaling function.

4. The overvoltage protection device according to claim 3, wherein a mechanically released pin forms the status indicator, wherein the pin blocks the device from re-inserting into the NH fuse base when released.

5. The overvoltage protection device according to claim 1, wherein a parallel connection is provided in the common housing which consists of a series connection of voltage-switching element, the sacrificial element and the short circuit device in the first branch and at least one voltage-limiting element in the second branch.

6. The overvoltage protection device according to claim 5, wherein the voltage-switching element is configured as one of a spark gap, gas discharger, semiconductor switch and diode, including one which is triggerable.

7. The overvoltage protection device according to claim 5, wherein the voltage-limiting element is configured as a varistor or PTC element.

8. The overvoltage protection device according to claim 2, wherein the sacrificial element is configured as a metallic part having defined melting properties upon current load.

9. The overvoltage protection device according to claim 2, wherein the sacrificial element is fixed in temperature-sensitive manner and can be triggered independently of its melting integral upon a defined temperature being reached.

10. The overvoltage protection device according to claim 1, wherein the operational and sensitivity range of the device can be set via an access opening in the housing.

11. The overvoltage protection device according to claim 10, wherein the response voltage can be set by adjustable voltage dividers or bridges or by isolating provided switching elements or passivating or activating electronic components.

12. The overvoltage protection device according to claim 4, wherein the pin is configured as a spring-preloaded firing pin, its movement enabled by the movable part upon a short circuit but otherwise blocked, wherein both the direction of movement as well as the distance traveled by the firing pin can be selected independently of the direction and extent of movement of the movable part of the short circuit device.

13. The overvoltage protection device according to claim 6, wherein using a power semiconductor as voltage-switching element ensures targeted control of the device upon electrical or mechanical disruptions to the respective system to be protected.

14. The overvoltage protection device according to claim 2, wherein the short-circuiter with the sacrificial element can be integrated into a spark gap as the overvoltage protection element employed.

15. The overvoltage protection device according to claim 14, wherein the spark gap comprises a triggering unit.

* * * * *